H. Grow,
Shutter Fastener.
No. 108,256.        Patented Oct. 11, 1870.
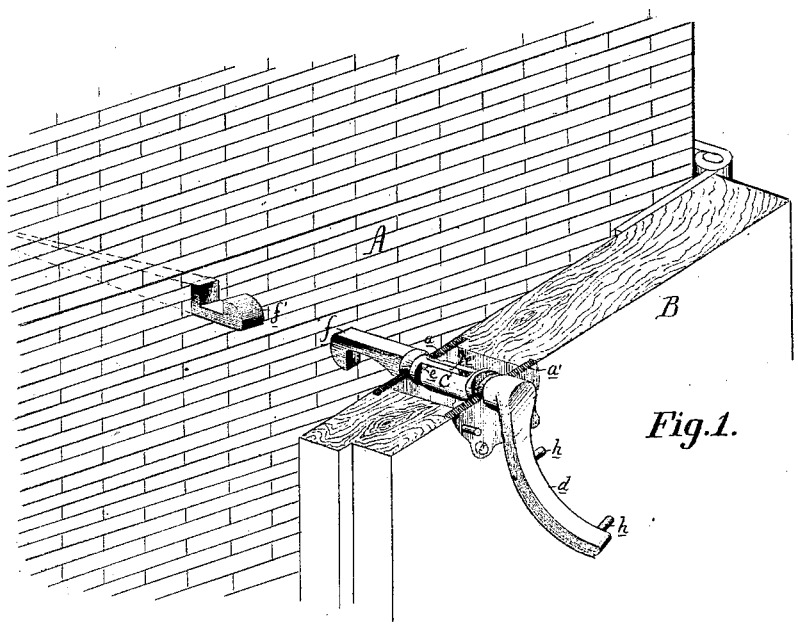
Fig. 1.
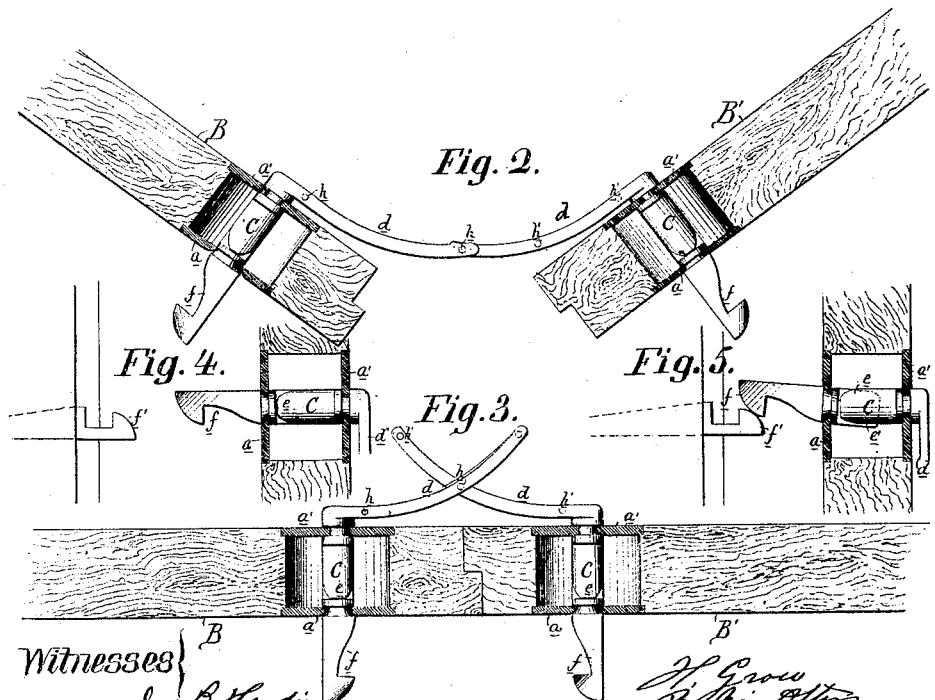
Fig. 2.
Fig. 4.      Fig. 3.      Fig. 5.
Witnesses

United States Patent Office.

HENRY GROW, OF PHILADELPHIA, ASSIGNOR TO HIMSELF AND WILLIAM GROW SMITH, OF NORRISTOWN, PENNSYLVANIA.

Letters Patent No. 108,256, dated October 11, 1870.

IMPROVEMENT IN SHUTTER-FASTENERS.

The Schedule referred to in these Letters Patent and making part of the same.

I, HENRY GROW, of Philadelphia, county of Philadelphia, State of Pennsylvania, have invented an Improved Shutter-fastening Device, of which the following is a specification.

Nature and Object of the Invention.

My invention consists of a device, too fully described hereafter to need preliminary explanation, for securing shutters to a wall, retaining them in a bowed condition, and locking them when closed.

Description of the Accompanying Drawing.

Figure 1 is a sectional perspective view of my device for bowing and fastening shutters.

Figures 2 and 3, sectional plan views, showing the device as it appears when used for bowing the shutters and for locking them when closed.

Figures 4 and 5, views showing the mode of fastening the shutters to the wall by the device.

General Description.

A represents a portion of the wall of a building, and B and B' two shutters hinged to the said wall, in the usual manner.

The fastening device is arranged near the outer edge of each shutter, and consists of a spindle, C, extending through and projecting from both sides of the shutter, and turning in plates a and a', secured to the same.

At one end of the spindle is a curved arm, d, and at its opposite end a hook, f, adapted to a corresponding hook, f', driven into the wall A, at the rear of the shutter, when the latter is thrown back. Each of the hooks f and f' is beveled or rounded at the end, so that when the shutter is opened and thrown back against the wall, the said hook f, on striking the beveled or rounded end of the hook f', may be raised, slide over, and catch on the same.

The hook f is maintained in a proper position to engage with the hook f' by means of the arm d, at the opposite side of the shutter, which, hanging downward, tends to prevent the spindle from turning, and the independent tilting motion of the said hook is permitted by forming the spindle in two sections, that portion of the spindle to which the arm d is attached being forked at e, and receiving between its forks a tongue, e', of the other portion of the spindle, to which the hook f is attached.

The shutter, when fastened to the wall by means of the hooks, will be held firmly, and prevented from rattling, and the hooks can be readily disengaged by operating the arms d.

Instead of forming the spindles in two sections, for the purpose of allowing the hooks f to rise and pass over the hooks f', the said spindles might be made in one piece, and the hooks f' be arranged to yield, or one or both of the said hooks might be elongated and made of spring steel, so as to yield when brought in contact with each other.

The arms d d of the two shutters, besides serving to maintain the hooks in a proper position, and as mediums for releasing the hooks, answer also as bowing devices and as locks for securing the shutters together. One of the said arms has two or more projecting pins, h, and the opposite arm corresponding holes h', so that when the shutters are partially closed, as shown in fig. 2, they may be connected together, and thus held by means of the arms, on inserting one of the pins, h, into one of the holes, h'.

The shutters may be bowed closer together by inserting the pin h into other of the holes h', and the shutters may be locked, when completely closed, by crossing the arms, as shown in fig. 3, and connecting them together by means of the pins and holes, or by clamps or other devices.

The arms d may be angular instead of curved, and in some cases simple knobs or handles might be substituted for the arms, when they are only used as mediums for turning the spindles and hooks.

By making each spindle in two sections, and connecting the sections together, as above described, the spindle may be lengthened and shortened to a limited extent in fitting the device to shutters of different thicknesses.

Claims.

1. A shutter-fastening device, consisting of a spindle arranged to turn in the shutters, and having at one end an arm, d, or other operating attachment, and at its opposite end a hook, f, adapted to a hook, f', secured to the wall, all substantially as described.

2. The spindle C of the fastener, made of two revolving sections, one having a projection extending into a slot in the other, as set forth.

3. The arms d d, secured to spindles revolving in the two shutters, and adapted and arranged for direct connection to each other, as described.

In testimony whereof I have signed my name to this specification in the presence of two subscribing witnesses.

HENRY GROW.

Witnesses:
WM. A. STEEL,
F. B. RICHARDS.